United States Patent
Ksienzyk

(10) Patent No.: US 12,343,719 B2
(45) Date of Patent: Jul. 1, 2025

(54) CO2 GAS SUPPLY BY MEANS OF AN AQUARIUM PRESSURIZED GAS VESSEL WITH A NUTRIENT SUBSTRATE

(71) Applicant: SUNBAU GMBH, Erkrath (DE)

(72) Inventor: Horst Ksienzyk, Solingen (DE)

(73) Assignee: SUNBAU GMBH, Erkrath (DE)

( * ) Notice: Subject to any disclaimer, the term of this patent is extended or adjusted under 35 U.S.C. 154(b) by 437 days.

(21) Appl. No.: 17/782,571

(22) PCT Filed: Dec. 7, 2020

(86) PCT No.: PCT/EP2020/084941
§ 371 (c)(1),
(2) Date: Jun. 3, 2022

(87) PCT Pub. No.: WO2021/111009
PCT Pub. Date: Jun. 10, 2021

(65) Prior Publication Data
US 2023/0018955 A1    Jan. 19, 2023

(30) Foreign Application Priority Data

Dec. 7, 2019   (DE) .......................... 202019004999.1

(51) Int. Cl.
*B01J 7/00* (2006.01)
*A01K 63/04* (2006.01)
(Continued)

(52) U.S. Cl.
CPC ............... *B01J 7/00* (2013.01); *A01K 63/042* (2013.01); *B01F 23/2312* (2022.01);
(Continued)

(58) Field of Classification Search
CPC ............ A01K 63/042; B01F 23/23762; B01F 23/2312; B01F 2101/305; B01J 7/00;
(Continued)

(56) References Cited

U.S. PATENT DOCUMENTS

2011/0108494 A1 *  5/2011  Whitaker ............. A01K 63/042
                                                            210/188
2018/0295830 A1 * 10/2018  Babcock ............... A01M 1/106

FOREIGN PATENT DOCUMENTS

CN          110419491 A        11/2019
DE          3731678 A1  *       4/1989
(Continued)

OTHER PUBLICATIONS

Translation of DE 3731678 A1 (Year: 1989).*
Abstract of WO 01/82687 A1 (Year: 2001).*
Translation of KR 20180072054 A (Year: 2018).*

*Primary Examiner* — Charles S Bushey
(74) *Attorney, Agent, or Firm* — Patent Technologies, LLC; Robert D. Gunderman, Jr.

(57) ABSTRACT

The present invention relates to an aquarium pressurized gas vessel for supplying an aquarium (12) with CO2 gas generated in the aquarium pressurized gas vessel (10), the aquarium pressurized gas vessel (10) having
  a receiving vessel (14) for receiving a nutrient substrate and a reactant interacting with the nutrient substrate such that the nutrient substrate and the reactant react with each other to generate CO2 gas;
  a closing device (16) for closing the receiving vessel (14) in a pressure-tight manner;
  a gas outflow device (18) for extracting CO2 gas from the aquarium pressurized gas vessel (10) for the aquarium (12), the CO2 gas having a gassing pressure (p_B) when flowing into the gas outflow device (18);
  a gas vessel pressure regulator (20) for adjusting a gas vessel pressure (p_G) which substantially corresponds to the gassing pressure (p_B).

Further, the present invention relates to a CO2 gassing system (28) which includes the aforementioned aquarium pressurized gas vessel (10).

16 Claims, 3 Drawing Sheets

(51) Int. Cl.
  *B01F 23/231* (2022.01)
  *B01F 23/237* (2022.01)
  B01F 101/00 (2022.01)
  F17C 1/00 (2006.01)

(52) U.S. Cl.
  CPC .. *B01F 23/23762* (2022.01); *B01F 2101/305* (2022.01); *F17C 1/00* (2013.01); *F17C 2205/0332* (2013.01); *F17C 2221/013* (2013.01); *F17C 2223/0123* (2013.01); *F17C 2250/0636* (2013.01); *F17C 2270/0736* (2013.01)

(58) Field of Classification Search
  CPC .............. F17C 1/00; F17C 2205/0332; F17C 2221/013; F17C 2223/0123; F17C 2250/0636; F17C 2270/0736
  See application file for complete search history.

(56) References Cited

FOREIGN PATENT DOCUMENTS

| | | |
|---|---|---|
| DE | 299 02 414 U1 | 4/1999 |
| DE | 201 17 708 U1 | 2/2002 |
| JP | H07 203805 A | 8/1995 |
| KR | 20180072054 A * | 6/2018 |
| WO | WO 01/82687 A1 * | 11/2001 |

* cited by examiner

CO2 GAS SUPPLY BY MEANS OF AN AQUARIUM PRESSURIZED GAS VESSEL WITH A NUTRIENT SUBSTRATE

TECHNICAL FIELD

The present invention relates to an aquarium pressurized gas vessel for supplying CO2 gas generated in the aquarium pressurized gas vessel to an aquarium.

Furthermore, the present invention relates to a CO2 gassing system comprising the aforementioned aquarium pressurized gas vessel.

BACKGROUND OF THE INVENTION

For the supply of oxygen to fish, a sufficient planting of the aquarium is of high importance. For this purpose, the plants require carbon dioxide, CO2, which forms the basis for oxygen. CO2 gas is usually used in aquaristics for supply of plants and for regulating the pH value. In this process, gaseous CO2 is dissolved in the aquarium water and is made available to the plants for photosynthesis or cell construction. For regulating the pH value, the gaseous CO2 is likewise dissolved in the water so that its pH value decreases. In principle, gaseous CO2 can be added metered to the water via measurement and control electronics. For this purpose, the following two different methods of providing CO2 gas are used in aquaristics for decades.

On the one hand, CO2 gas is provided by means of CO2 pressure cartridges, in which the cartridge pressure is reduced by a pressure reducer to such an extent that the CO2 gas corresponds to a pressure level, so that the aquarium can be gassed with CO2, which has a gassing pressure, without further complications.

Since without light entering an aquarium, the photosynthesis process of the plants disposed within it stops, it is common that the supply of CO2 gas is paused during nighttime hours. This is usually implemented with CO2 pressure cartridges by interrupting the gas flow in the pipeline, and thus the supply of CO2 gas. This interruption can be implemented, for example, by a solenoid valve.

The same technique is used for pH regulation with CO2 pressure cartridges, but the CO2 gas supply is not switched in day/night intervals, but the interruption of the CO2 gas supply is controlled by control electronics, wherein the switching intervals are determined by permanent measurement of the pH value.

Relevant safety regulations must be observed when storing, operating and transporting CO2 pressure cartridges, wherein it must be ensured by way of example that national safety regulations apply with regard to the CO2 pressure cartridges used.

To fill reusable CO2 pressure cartridges, they must be transported to a filling station and transported away again after filling. The transport of CO2 pressure cartridges is also subject to safety regulations. A CO2 pressure cartridge usually comprises an overpressure safety device to prevent excessive cartridge pressure and to protect the CO2 pressure cartridge. Usually, the overpressure protection is triggered at a cartridge pressure of about 58 bar.

CO2 pressure cartridges with, for example, more than 50 grams of CO2 filling are often not suitable for central warehousing due to national safety regulations and are therefore not suitable for nationwide distribution with distribution to retailers.

In addition to the above transport and logistics problems and the national safety regulations to be met, the use of CO2 pressure cartridges has another disadvantage. To supply CO2 to aquariums, additional technical equipment is required to reduce the cartridge pressure of up to 58 bar. Accordingly, the gassing pressure, i.e. the pressure at a gas outflow device, must be reduced relative to the cartridge pressure, i.e. the pressure in the CO2 pressure cartridge. This is necessary in order to precisely regulate the required amount of CO2 and in order not to swirl the aquarium with currents in such a way that the animals living in it would be harmed. Furthermore, the animals living in the aquarium would receive too much CO2 and thus too little oxygen, O2, due to an uncontrolled CO2 supply, which could cause them to suffocate. The pressure reducers used for this purpose further increase the cost of the CO2 cartridge system.

On the other hand, CO2 gas can be produced biologically on site, i.e. at the end user, and fed into the aquariums to be supplied. For this purpose, CO2 fermentation systems usually comprise fermentation vessels made of plastic, which are usually filled with a sugar-containing nutrient substrate. By adding yeast, a fermentation process is initiated, in which CO2 gas is released. The advantage of this process is that no CO2 pressure cartridges have to be filled and transported. The disadvantage is that the CO2 gas supply cannot be metered or can only be metered inadequately, and it is also not possible to temporarily interrupt the fermentation process. Interrupting the CO2 outflow would lead to an uncontrolled pressure increase in the fermentation vessel. In the worst case, the pressure increase would even cause the fermentation vessel to burst. The CO2 gas generated by the fermentation process is fed from the fermentation vessel into the aquarium without a dosing gas outflow device. Dosing would possibly lead to an excessive increase in pressure, since the fermentation process could possibly generate more CO2 gas than would be discharged by a dosing gas outflow device. Due to these disadvantages, the method is mainly used for less demanding aquariums, in which dosing of the added CO2 amount is not necessary, or in which it is ensured that CO2 overdosing is not possible due to the small amount of CO2 introduced in relation to the aquarium water. However, this means that the risk of a constant CO2 underdosing is imminent. Thus, the previously known fermentation process is also unsuitable for a reliable pH regulation.

DESCRIPTION OF THE INVENTION

Based on this situation, it is an object of the present invention to provide an aquarium pressurized gas vessel that overcomes the aforementioned disadvantages.

In particular, the object may relate to a low-cost aquarium pressurized gas vessel comprising CO2 gas released therein, wherein the CO2 gas supply into an aquarium can be interrupted without high risk.

The object of the invention is achieved by the features of the independent main claims. Advantageous embodiments are provided in the dependent claims. Where technically possible, the teachings of the dependent claims may be combined as desired with the teachings of the main claims and other dependent claims.

Accordingly, the object is achieved in particular by an aquarium pressurized gas vessel for supplying an aquarium with CO2 gas generated in the aquarium pressurized gas vessel, wherein the aquarium pressurized gas vessel comprises:
a receiving vessel for receiving a nutrient substrate and
a reactant interacting with the nutrient substrate in such a way that the nutrient substrate and the reactant react with each other to generate CO2 gas;

a closing device for pressure-tight sealing the receiving vessel;

a gas outflow device for, in particular interruptible, $CO_2$ gas extraction from the aquarium pressurized gas vessel for the aquarium, wherein the $CO_2$ gas has a gassing pressure when flowing into the gas outflow device;

a gas vessel pressure regulator for adjusting a gas vessel pressure which corresponds substantially to the gassing pressure.

Advantageous aspects of the claimed invention are explained below, and preferred modified embodiments of the invention are described further below. Explanations, in particular with respect to advantages and definitions of features, are basically descriptive and preferred, but not limiting, examples. Where an explanation is limiting, this is explicitly mentioned.

In other words, it is particularly provided that now an aquarium pressurized gas vessel for a $CO_2$ gassing system, and the $CO_2$ gassing system itself, are available for supplying a sophisticated aquarium, wherein a precise $CO_2$ control and safe interruption of the $CO_2$ gas supply can be achieved. The $CO_2$ gassing system operates without the use of an additional pressure reducer, since the gas vessel pressure generated in the aquarium pressurized gas vessel corresponds to the desired gassing pressure for precise $CO_2$ gas delivery and therefore does not need to be reduced. In contrast, overpressure rising due to $CO_2$ generation can be reduced, for example, by means of a gas vessel pressure regulator. Thus, the gas vessel pressure and the gassing pressure optimally always correspond to each other. The gas vessel pressure is usually only reduced when the fermentation process starts or when the nutrient substrate, for example sugar-containing nutrient substrate, and/or the reactant, for example yeast, is/are no longer usable, in particular is/are depleted. In other words, the gas vessel pressure is reduced in particular at the beginning and/or at the end of the fermentation process.

The receiving vessel comprises a space for receiving the nutrient substrate and the reactant interacting with the nutrient substrate. In this respect, the receiving vessel can, for example, comprise another, preferably removable, vessel within its space for receiving the nutrient substrate and the reactant interacting with the nutrient substrate. This facilitates the replacement of nutrient substrate and reactant. Alternatively, however, it is preferably also possible that the receiving vessel itself receives the nutrient substrate and the reactant, so that the nutrient substrate and the reactant are separated from the environment only by the at least one wall of the receiving vessel.

The closing device for pressure-tight sealing of the receiving vessel can, for example, be a lid. This can be completely detachable or removable from the receiving vessel.

Alternatively, it is preferably also possible that the closing device is connected to the receiving vessel in a movable, for example pivotable, manner.

Alternatively, preferably, the receiving vessel and the closing device can be configured in such a way that the receiving vessel comprises, for example, a recess, in particular arranged laterally, and that the closing device is designed to cover this recess, for example as a pressure-tight plate closure.

The gas outflow device has the precise adjustment or metering of the $CO_2$ gas flowing out of the aquarium pressurized gas vessel as a function and does not serve as a pressure reducer. If the gas vessel pressure should be changed, this happens to a negligible extent. The metering gas outflow device can be a needle valve by way of example. In particular, the gas outflow device comprises no overpressure protection.

That the $CO_2$ gas has a gassing pressure when flowing into the gas outflow device refers to that pressure at which the $CO_2$ gas can flow into the aquarium without causing damage. The overall formulation is to be interpreted in such a way that the $CO_2$ gas already has the gassing pressure when it flows into the gas outflow device. In other words, this means that no pressure reducer is disposed between the $CO_2$ outlet area of the receiving vessel and/or the closing device and the gas outflow device. Consequently, the $CO_2$ gas flows directly from the space in which the fermentation process takes place into the gas outflow device.

The gas vessel pressure regulator can be designed in different ways. What is relevant, however, is that it adjusts the gas vessel pressure in such a way that it essentially corresponds to the desired gassing pressure. In particular, the gas vessel pressure regulator can be permanently actuatable. Whereas in conventional $CO_2$ pressure cartridges, for example, a pressure reducer reduces the gas vessel pressure to the gassing pressure only when $CO_2$ gas flows into the aquarium, the gas vessel pressure is kept permanently at the gassing pressure by the gas vessel pressure regulator.

Thus, the space in which the fermentation process occurs does not experience a gas vessel pressure that interrupts, for example, the fermentation process as a result of excess pressure, even when $CO_2$ gas extraction is interrupted by the gas outflow device. Thus, as soon as the gas vessel pressure is reached by the started fermentation process, the gassing pressure is immediately available.

That the gas vessel pressure substantially corresponds to the gassing pressure means in particular that the gas vessel pressure deviates from the gassing pressure by at most 20 percent inclusive, preferably by at most 15 percent inclusive, particularly preferably by at most 10 percent inclusive, most preferably by at most 5 percent inclusive. Here, preferably, the gas vessel pressure can be seen as the base value. Alternatively, the gassing pressure can be seen as the base value. Preferably, the gas vessel pressure and the gassing pressure are equal. With decreasing deviation, the $CO_2$ gas can be better dosed in the gas outflow device for flowing into the aquarium.

The pressure values are given here in the unit bar. In this context, the mean air pressure of the atmosphere, also called atmospheric pressure, is preferably 101325 Pa, i.e. 101.325 kPa, i.e. 1013.25 hPa, i.e. 1 bar, as a reference value for the ambient pressure at sea level.

According to the International System of Units (Si), 1 bar is equal to exactly 105 pascals, so this can be simplified and preferably assumed for the ambient pressure.

The pressure values within the overall disclosure can be converted accordingly according to one of the above statements.

The pressure values preferably apply at room temperature, particularly preferably at 21 degrees Celsius.

All percentage values refer to pressure values.

The gas vessel pressure and the gassing pressure are each considered to be overpressures in the context of the overall disclosure. This means that the preferred pressures are to be added to the ambient pressure, which is typically 1 bar. For example, this means that a gas vessel pressure of 0.8 bar at an ambient pressure of 1 bar, corresponds to a total gas vessel pressure of 1.8 bar. In particular, this applies to all gas vessel and gassing pressures.

Moreover, this means in particular that the gas vessel pressure as well as the gassing pressure are predefined and limited by the gas vessel pressure regulator at the upper limit.

Advantageously, the nutrient substrate and/or the reactant itself can be supplied to the aquarium pressurized gas vessel. A transport of the aquarium pressurized gas vessel is thus unnecessary.

Preferably, the nutrient substrate is a sugar-containing nutrient substrate. Alternatively or additionally, it is preferred that the reactant is yeast. Provided that the nutrient substrate is a sugar-containing nutrient substrate and the reactant is yeast, $CO_2$ gas can be generated as part of a generally known fermentation process. An advantage is that the nutrient substrate and the reactant can be provided by means available in the household, namely sugar water and yeast, for example. However, a gel-like sugar-containing nutrient substrate is advantageous, since it generates the $CO_2$ gas more uniformly.

The invention thus relates to an aquarium pressurized gas vessel as a fermentation vessel for biological and/or chemical $CO_2$ production, in particular by means of yeast. In this case, it is possible to keep generated $CO_2$ gas under pressure build-up inside the aquarium pressurized gas vessel when shutting off the gas outflow device. This allows the gas outflow device to be interrupted and opened as often as required for $CO_2$ extraction. Thus, the $CO_2$ gas generated in the aquarium pressurized gas vessel is reliably made available for quantitatively determined $CO_2$ addition as well. The fermentation process, or another process for $CO_2$ generation, can replace $CO_2$ pressure cartridges for $CO_2$ addition in aquariums by using the aquarium pressurized gas vessel. Here, by means of, for example, one or more gas vessel pressure regulators, an increase of the gas vessel pressure beyond the desired gassing pressure within the vessel is prevented. When used in the invention, the gas vessel pressure regulator, in particular designed as a pressure relief valve, serves to preset the gas vessel pressure and not to protect the aquarium pressurized gas vessel. The generated $CO_2$ gas is preset to a gassing pressure advantageous for further use. In this case, the excess $CO_2$ gas is released into the ambient air by the gas vessel pressure regulator, thus maintaining the gas vessel pressure at a uniform level.

Since a lower overpressure builds up in the aquarium pressurized gas vessel compared to the $CO_2$ cartridge system, regular inspection of the vessel with regard to national safety regulations is not required. The invention solves the problem of storage and transportation in that, after the components for $CO_2$ generation in the vessel have been consumed, the content of the vessel can be easily replaced to start $CO_2$ generation renew. The components to be refilled are common in the household and are not subject to restrictions on storage and transportation.

A combination of the two previously known systems, namely an already known $CO_2$ generation by means of a nutrient substrate combined with a previously known system with a $CO_2$ pressure cartridge mentioned at the beginning and with a conventional overpressure protection, would not work with the present aquarium pressurized gas vessel. The gas vessel pressure would increase steadily. Then, however, a conventional cost-intensive pressure reducer would also be required because of the high gas vessel pressure, since otherwise the gassing pressure and thus the $CO_2$ gas supply into the aquarium would be too high.

In other words, the idea can be put forward that the principle of bottle fermentation is used to supply $CO_2$ gas into the aquarium in a modified way.

One aspect of the invention is that the gas vessel pressure regulator is used as a pressure reducer, which preferably limits the gas vessel pressure as an overpressure relative to an ambient pressure from between 0.6 bar inclusive and 1.0 bar inclusive, particularly preferably to 0.8 bar. The gas vessel pressure regulated in the proposed manner enables $CO_2$ gas to be stored in a limited extent, insofar as this is essentially enabled by the receiving vessel, as well as a reliably adjustable fine regulation option of the $CO_2$ gas supply into the aquarium. Moreover, $CO_2$ diffusers with a flow resistance of, for example, 0.3 to 0.6 bar as overpressure relative to an ambient pressure can be operated without any problems.

In a closed aquarium pressurized gas vessel without overpressure protection and with the nutrient substrate and the reactant, the constantly increasing gas vessel pressure would, for example, eventually cause $CO_2$ generation to stop due to the excessively high gas vessel pressure. In the worst case, in particular, the nutrient substrate and/or the reactant could be affected by the high gas vessel pressure in such a way that $CO_2$ generation is no longer possible even with a subsequent drop in gas vessel pressure, so that an at least partial replacement of the nutrient substrate and/or reactant could possibly become necessary. The use of the gas vessel pressure regulator prevents such an uncontrolled increase in $CO_2$ content within the aquarium pressurized gas vessel and thus allows $CO_2$ generation to continue for a longer period of time, up to, for example, 30 to 40 days. In particular, the limiting factor for maintaining the functionality of the microorganisms used is not the increasing $CO_2$ content of the liquid contained in the vessel, which would cause the microorganisms to die, but the accumulating alcohol content or the depletion of the nutrients contained therein. The liquid volume can be dimensioned in such a way that the maximum accumulating alcohol content also does not become a limiting factor and thus the entire nutrient content from the liquid can be used for $CO_2$ generation before the microorganisms die, for example, due to a lack of nutrients.

In particular, the aquarium pressurized gas vessel can comprise one or more gas vessel pressure regulators which is/are preset to create an overpressure within the aquarium pressurized gas vessel which corresponds to the ideal, or the almost ideal, or the approximately ideal initial pressure for metering the $CO_2$ gas by means of a downstream gas outflow device as a metering device.

A person skilled in the art understands that the gas vessel pressure or the gassing pressure is not permanently applied. As far as pressures or reactions are mentioned, this applies, as far as logic does not suggest otherwise, to the condition that a stable $CO_2$ generation takes place by the nutrient substrate and the reactant. In real terms, the course of $CO_2$ generation corresponds to a Gaussian curve. In the aquarium pressurized gas vessel, the course of the gas vessel pressure is somewhat more stable in the medium range. As soon as the nutrient substrate and the reactant are added together in the aquarium pressurized gas vessel, fermentation and thus $CO_2$ generation start promptly. As soon as the desired gas vessel pressure or gassing pressure is reached, it remains largely stable in the aquarium pressurized gas vessel. As soon as the fermentation components are consumed, the amount of $CO_2$ produced is reduced.

According to a modified embodiment of the invention it is provided that the gas vessel pressure regulator is designed in such a way that the gas vessel pressure has an overpressure relative to an ambient pressure of at least 0.3 bar inclusive, preferably at least 0.5 bar inclusive, particularly preferably at least 0.6 bar inclusive. This corresponds to a preferred gassing pressure for gassing the aquarium with sufficient CO2 gas. Since the gas vessel pressure and the gassing pressure substantially correspond to each other, the advantageously formed gas vessel pressure regulator enables a sufficient supply of CO2 into the aquarium.

Alternatively, it is preferably provided that the gas vessel pressure regulator is configured in such a way that the gas vessel pressure has an overpressure relative to an ambient pressure of at least 0.8 bar inclusive. It has been found that this is a particularly preferred value for optimally supplying CO2 gas to the aquarium, so that a pH value favorable for the ecosystem is set in conventional aquariums.

According to a modified embodiment of the invention, it is provided that the gas vessel pressure regulator is configured in such a way that the gas vessel pressure has an overpressure relative to an ambient pressure of at most and including 3.0 bar, preferably at most and including 1.0 bar, particularly preferably at most and including 0.9 bar. This corresponds to a preferred gassing pressure for gassing the aquarium with sufficient CO2 gas. Since the gas vessel pressure and the gassing pressure essentially correspond to each other, the advantageously designed gas vessel pressure regulator enables an optimal CO2 supply into the aquarium without swirling the water of the aquarium in a way that is harmful to the ecosystem or negatively influencing the pH value due to too much CO2 gas.

Alternatively, it is preferably provided that the gas vessel pressure regulator is configured in such a way that the gas vessel pressure has an overpressure relative to an ambient pressure of at most and including 0.8 bar. It has been found that this is a particularly preferred value for optimally supplying CO2 gas into the aquarium, so that a pH value favorable for the ecosystem is set in conventional aquariums.

According to a modified embodiment of the invention, it is provided that the gas outflow device comprises a needle valve. A preferred needle valve is a type of valve comprising a small orifice and a threaded, needle-shaped plunger. It allows a precise regulation of the flow. The plunger can be moved longitudinally by means of the thread. Accordingly, the needle-shaped tip enlarges or reduces the opening of the valve only slightly, since the needle has to be moved over a relatively wide distance even for small changes. Due to the small taper angle of the needle, a very sensitive adjustment of the flow rate is thus achieved. Packing-sealed valves are dynamically sealed valves. Dynamic sealing means that a relative movement between the sealing body (shaft/ball/plug) and the sealing material is possible. The latter is also called packing. Typical sealing materials are Teflon or O-rings made of Perbunan, Viton, EPR/EPDM, Kalrez for standard valves or PEEK. These valve types have a silicone-based lubrication ex-factory. This increases the lifetime of the packing, minimizes abrasion in the valve, and lowers the required actuation torque.

According to a modified embodiment of the invention it is provided that the gas vessel pressure regulator comprises a safety valve. Preferred safety valves, also called pressure relief valves, belong to the safety fittings according to DIN EN 806-1 or DIN 3211 and protect the pressurized aquarium pressurized gas vessel from an undesired gas vessel pressure increase. The standards are intended to mean the currently valid version, but at least according to the version at the date of application. If the predefined vessel pressure is exceeded, CO2 gas is discharged into the atmosphere or into collecting pipelines.

According to a modified embodiment of the invention it is provided that the aquarium pressurized gas vessel comprises an opening safety device in order to adjust the gas vessel pressure to the ambient pressure in case of an actuation. If the aquarium pressurized gas vessel is under pressure, opening may be difficult or even risky. However, if the opening safety device is actuated, the gas vessel pressure drops to the ambient pressure, so that the closing device can be opened without increased risk.

According to a modified embodiment of the invention, it is provided that the aquarium pressurized gas vessel is reusable, wherein in particular the receiving vessel is reclosable by the closing device in a pressure-tight manner. This is particularly environmentally friendly. Typically, fermentation vessels are disposable. Due to the fact that the closing device is reclosable in a pressure-tight manner, the aquarium pressurized gas vessel can be reused in an environmentally friendly manner.

According to a modified embodiment of the invention, it is provided that the closing device is in the form of a screw-on lid. This enables an appropriate embodiment of the aquarium pressurized gas vessel, while allowing a reliable seal even after many gassing cycles.

According to an alternative modified embodiment of the invention, it is provided that the closing device is formed as a snap-on lid. Preferably, the snap-on lid comprises movable closure clips which interact in a form-fitting manner with the correspondingly formed reception vessel. It has been found that this form-fitting principle advantageously seals the aquarium pressurized gas vessel even at low pressures. In particular, the snap-on lid comprises a rotary closure mechanism which is preferably arranged coaxially with the closure device, i.e. with the same axis of rotation. Provided that the rotary closing mechanism is actuated, the closing clamps tighten or loosen the connection between the receiving vessel and the closing device. This allows an easy operation of the aquarium pressurized gas vessel, while enabling a reliable seal even after many gassing cycles.

According to a modified embodiment of the invention, it is provided that the gas outflow device comprises a shut-off mechanism for stopping the CO2 gas extraction. The shutoff mechanism may be actuated, for example, when the plants in the aquarium do not receive sunlight for photosynthesis, such as at night. This can prevent the pH value in the aquarium from developing negatively, especially since plants can even emit CO2 gas at night. The gas vessel pressure increasing thereby can be regulated by the gas vessel pressure regulator.

Exemplarily, the shut-off mechanism may comprise an electrically operated solenoid valve. The solenoid valve may also be provided as an alternative or in addition to the shut-off mechanism.

According to a modified embodiment of the invention, it is provided that the gas outflow device comprises a gassing bubble detection device for detecting the amount of CO2 gas flowing into the gas outflow device. The gassing bubble detection device may be, for example, a bubble counter. A bubble counter is conventionally used in chemical laboratory in experimental work with gases to check the intensity of the gas flow. Bubbles of uniform size emerge from the inlet tube and can be counted if the gas flow is not too large. The number of bubbles per time period is a measure of the amount of CO2 gas flowing through the apparatus. If the number of bubbles per time period decreases, this may indicate that the nutrient substrate and/or reactant are producing less CO2 gas due to their progressive depletion until they no longer produce CO2 gas at all. For example, if one bubble is detected per two seconds rather than per second, the end user can infer therefrom that he/she should obtain fresh nutrient substrate and/or fresh reactant. This ensures that the time without $CO_2$ generation is minimized. The bubble-by-bubble dosing is also useful for precise operation of $CO_2$ diffusers, which allow constant $CO_2$ saturation of the aquarium water by means of a previously calculated dosing, supplied via the amount of bubbles per time unit.

The shut-off mechanism may be arranged together with the gassing bubble detection device in an assembly, by way of example.

According to a modified embodiment of the invention it is provided that the gas outflow device is arranged at the receiving vessel, so that the $CO_2$ gas can flow from the receiving vessel into the gas outflow device. The closing device can be more easily released without the gas outflow device as a bulky component, in order to replace the nutrient substrate and/or the reactant.

Alternatively or additionally, it is possible that the gas outflow device is arranged at the closing device so that the $CO_2$ gas can flow from the closing device into the gas outflow device. This is a particularly useful embodiment if the closing device is designed as a top cover, so that the gas outflow device can be set to be easily accessible from above.

According to a modified embodiment of the invention, it is provided that the aquarium pressurized gas vessel comprises a seal which is circumferentially arranged in a coupling region between the receiving vessel and the closing device, so that in the closed state of the aquarium pressurized gas vessel the pressure-tight closing of the receiving vessel results due to the gas vessel pressure pressing the seal into the coupling region between the receiving vessel and the closing device. It has been found that this type of sealing system, which seals well especially at elevated pressure, enables a long-lasting seal. In this context, the seal, which is arranged circumferentially in a coupling region between the reception vessel and the closing device, can be understood as a ring. This ring presses itself into the contact gap between the receiving vessel and the closing device. The higher the gas vessel pressure, the more firmly the ring is pressed radially outward, and thus into the contact gap.

According to a modified embodiment of the invention, it is provided that the gas outflow device and the gas vessel pressure regulator are arranged in a common module which is connected to the receiving vessel and/or to the closing device. In particular, the module is replaceable. Thus, if the module is defective, the module can be easily replaced. Moreover, this increases the functionality of the aquarium pressurized gas vessel. For example, it might be that the required amount of $CO_2$ gas supplied depends on the plants and/or living organisms, in particular fish, present in the aquarium. In this case, a replacement or insertion of the required module can offer a simple and error source-reducing solution to technically inexperienced end users.

According to a modified embodiment of the invention, it is provided that the gas vessel pressure regulator is connected to the receiving vessel and/or to the closing device. At the receiving vessel, the gas vessel pressure regulator, due to the non-movement, is subject to a reduced risk of being damaged when the closing device, which is formed as a lid, is released from the aquarium pressurized gas vessel. In contrast, the gas vessel pressure regulator at the closing device can easier be replaced, if necessary, for example, to set a new gas vessel pressure or gassing pressure.

Moreover, a $CO_2$ gassing system comprising an aquarium pressurized gas vessel according to any one of the foregoing features is advantageous; wherein the $CO_2$ gassing system comprises a $CO_2$ gassing line connected to the gas outflow device for supplying the aquarium with the $CO_2$ gas generated in the aquarium pressurized gas vessel; wherein the $CO_2$ gassing line is configured to be submerged in the aquarium at its end remote from the gas outflow means.

Preferably, the $CO_2$ gassing line comprises a $CO_2$ diffuser at its end remote from the gas outflow device, wherein the $CO_2$ diffuser is particularly preferably operable with a flow resistance from 0.3 bar to 0.6 bar, both inclusive, as an overpressure relative to an ambient pressure. It has been found that this allows the $CO_2$ gas to be dissolved better in the water of the aquarium.

BRIEF DESCRIPTION OF THE DRAWINGS

In the following, the invention is explained in more detail with reference to the accompanying drawings by means of preferred examples of embodiments. The phrase figure is abbreviated in the drawings as FIG.

In the drawings.

DETAILED DESCRIPTION OF THE EXEMPLARY EMBODIMENTS

The described exemplary embodiments are merely examples that can be modified and/or supplemented in a variety of ways within the scope of the claims. Each feature which is described for a particular exemplary embodiment may be used independently or in combination with other features in any other exemplary embodiment. Any feature which is described for an exemplary embodiment of a particular claim category may also be used in a corresponding manner in an exemplary embodiment of another claim category.

Figure 1:
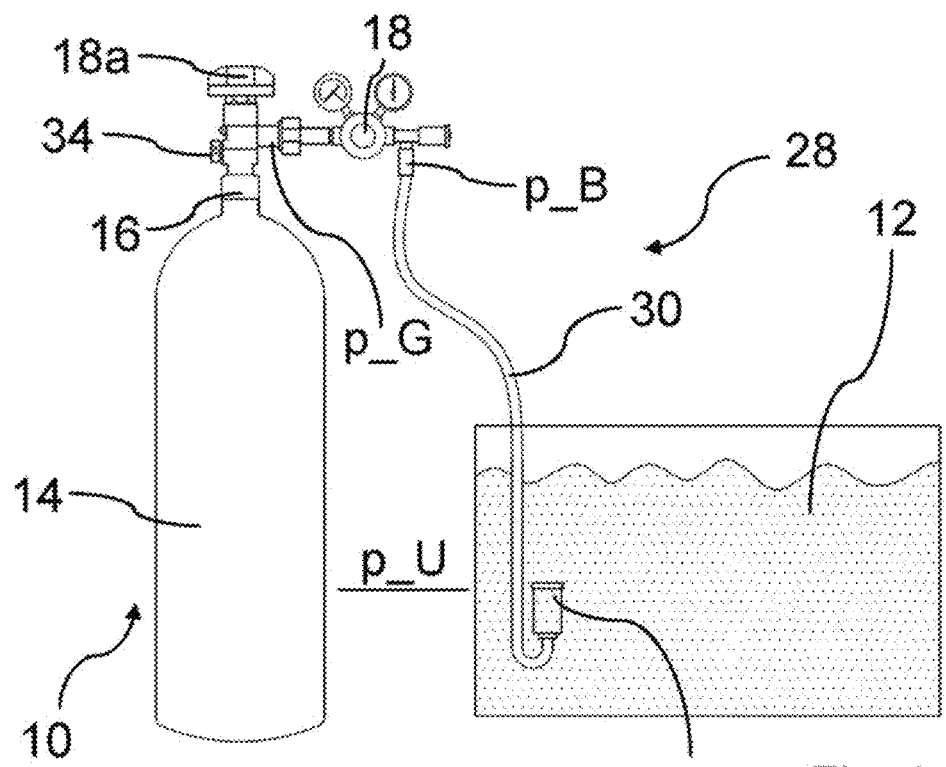
FIG. 1 is a schematic side view of a $CO_2$ cartridge system comprising a $CO_2$ pressure cartridge for $CO_2$ gassing of an aquarium according to a first prior art.

FIG. 1 shows a previously known $CO_2$ cartridge system as a $CO_2$ gassing system 28.

Figure 2:
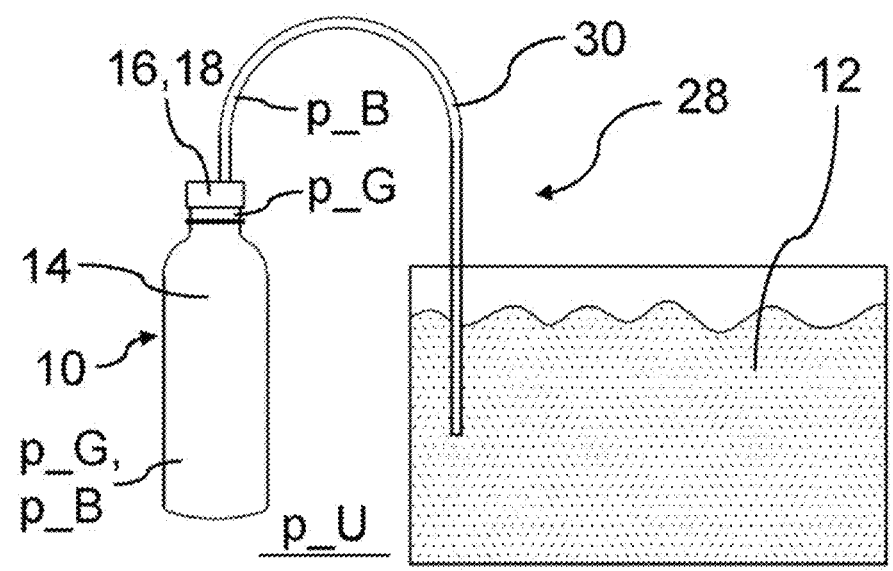
FIG. 2 is a schematic side view of a $CO_2$ fermentation system comprising a fermentation vessel for $CO_2$ gassing of an aquarium according to a second prior art.

FIG. 2 shows a previously known fermentation system as $CO_2$ gassing system 28.

Figure 3:
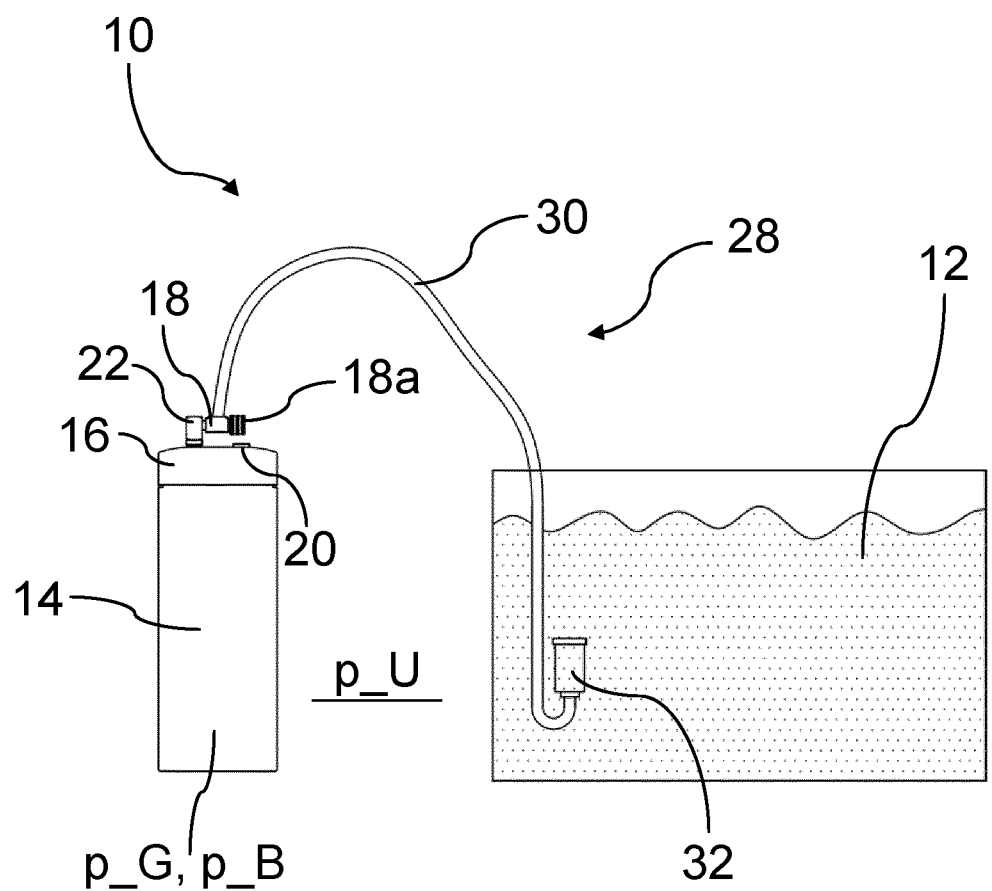
FIG. 3 is a schematic side view of a $CO_2$ gassing system comprising an aquarium pressurized gas vessel for $CO_2$ gassing of an aquarium according to a preferred exemplary embodiment of the invention.

FIG. 3 shows a $CO_2$ gassing system 28 according to a preferred exemplary embodiment of the invention. Here, the $CO_2$ gassing system 28 according to FIG. 3 comprises an aquarium pressurized gas vessel 10 according to a first embodiment.

Figure 4:
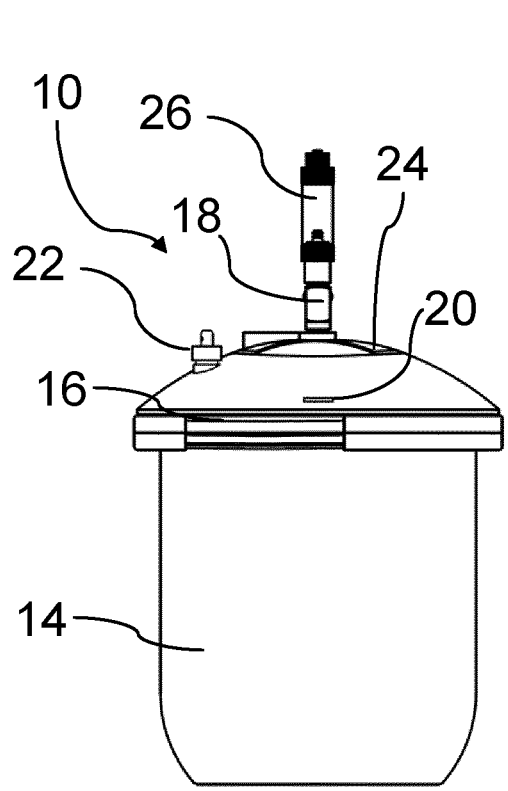
FIG. 4 is a schematic side view of an aquarium pressurized gas vessel according to a further preferred exemplary embodiment of the invention, wherein the aquarium pressurized gas vessel is designed alternatively to the aquarium pressurized gas vessel according to FIG. 3.
Figure 5:
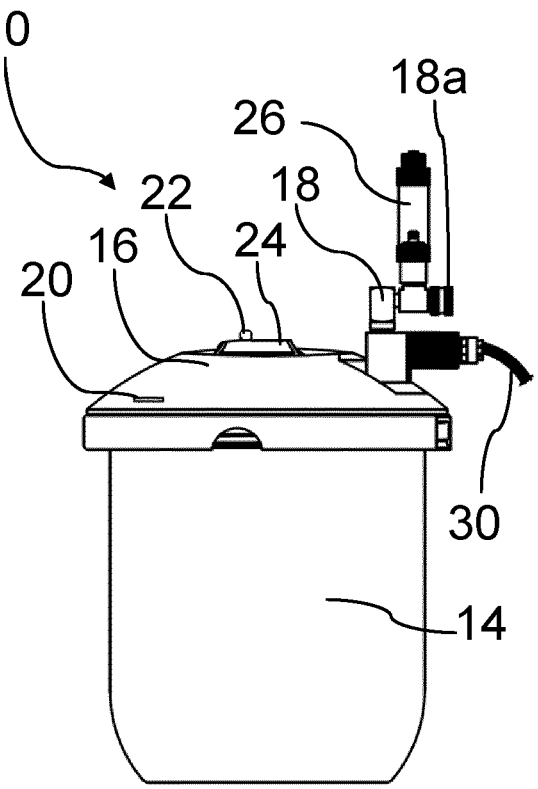
FIG. 5 is an alternative schematic side view of the aquarium pressurized gas vessel according to FIG. 4.
Figure 6:
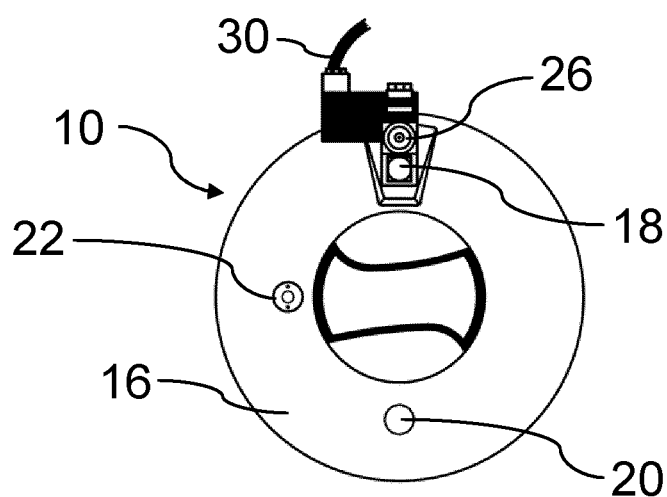
FIG. 6 is a schematic top view of the aquarium pressurized gas vessel according to FIGS. 4 and 5.

FIG. 4 shows an aquarium pressurized gas vessel 10 according to a second embodiment, wherein this aquarium pressurized gas vessel 10 can also be used in the $CO_2$ gassing system 28 according to FIG. 3. FIGS. 4 and 5 show the aquarium pressurized gas vessel 10 according to embodiment 2 in two differently rotated positions in a side view. FIG. 6 discloses the aquarium pressurized gas vessel 10 according to embodiment 2 in a top view.

FIG. 1 shows a CO2 cartridge system as a CO2 gassing system 28 comprising a CO2 pressure cartridge as an aquarium pressurized gas vessel 10. The aquarium pressurized gas vessel 10 serves to supply an aquarium 12 with CO2 gas from the CO2 pressure cartridge, which is formed as a receiving vessel 14 filled with CO2 gas. The receiving vessel 14 is closed in a pressure-tight manner by a closing device 16. The CO2 pressure cartridge is provided with a 58-bar pressure relief valve 34 in order to prevent excessive cartridge pressure $p\_G$ and to protect the CO2 pressure cartridge. Typically, the 58-bar pressure relief valve 34 is triggered at a cartridge pressure $p\_G$ of about 58 bar. To reduce this cartridge pressure $p\_G$, a gas outflow device 18 for CO2 gas extraction from the CO2 pressure cartridge for the aquarium 12 comprises a cost-intensive pressure reducer so that the cartridge pressure $p\_G$ is significantly reduced and reaches a gassing pressure $p\_B$. The gassing pressure $p\_B$ is many times smaller than the cartridge pressure $p\_G$. The CO2 cartridge system comprises a CO2 gassing line connected to the gas outflow device 18 for supplying the CO2 gas to the aquarium 12. In this regard, the CO2 gassing line 30 is configured to be submerged into the aquarium 12 at its end remote from the gas outflow device 18. A shut-off mechanism 18a can be used to stop the CO2 gas extraction from the CO2 pressure cartridge. Once the CO2 gas has completely flowed out of the CO2 pressure cartridge, the CO2 pressure cartridge is to be moved to a CO2 charging station and to be refilled with CO2 gas.

FIG. 2 shows a CO2 gassing system 28 configured as a fermentation system including a fermentation vessel configured as an aquarium pressurized gas vessel 10 for supplying CO2 gas generated in the aquarium pressurized gas vessel 10 to an aquarium 12. The fermentation system includes a receiving vessel 14 for receiving a nutrient substrate and a reactant interacting with the nutrient substrate such that the nutrient substrate and the reactant react with each other to generate CO2 gas. However, since the CO2 gas flows out immediately, no gas vessel pressure $p\_G$ builds up in the fermentation vessel. Furthermore, the fermentation system comprises a closing device 16 for closing the receiving vessel 14. The closing device 16 is further configured as a gas outflow device 18 for extracting CO2 gas from the fermentation vessel for the aquarium 12, wherein the CO2 gas has a gassing pressure $p\_B$ corresponding to the gas vessel pressure $p\_G$ when flowing into the gas outflow device 18. The fermentation system does not include a shut-off mechanism, as this could cause the fermentation vessel to burst. The fermentation system includes a CO2 gassing line 30 connected to the gas outflow device 18 for supplying the aquarium 12 with the CO2 gas generated in the aquarium pressurized gas vessel 10, wherein the CO2 gassing line 30 is configured to be submerged into the aquarium 12 at its end remote from the gas outflow device 18.

FIG. 3 shows a preferred exemplary embodiment of a CO2 gassing system 28 comprising an exemplary aquarium pressurized gas vessel 10.

The aquarium pressurized gas vessel 10 is configured to supply an aquarium 12 with CO2 gas generated in the aquarium pressurized gas vessel 10.

For this purpose, the aquarium pressurized gas vessel 10 comprises:
- a receiving vessel 14 for receiving a nutrient substrate and a reactant interacting with the nutrient substrate such that the nutrient substrate and the reactant react with each other to generate CO2 gas;
- a closing device 16 for sealing the receiving vessel 14 in a pressure-tight manner;
- a gas outflow device 18 for extracting CO2 gas from the aquarium pressurized gas vessel 10 for the aquarium 12, wherein the CO2 gas has a gassing pressure $p\_B$ when flowing into the gas outflow device 18; and
- a gas vessel pressure regulator 20 for adjusting a gas vessel pressure $p\_G$ which is substantially equal to the gassing pressure $p\_B$.

The CO2 gassing system 28 further comprises a CO2 gassing line 30 connected to the gas outflow device 18 for supplying the aquarium 12 with CO2 gas generated in the aquarium pressurized gas vessel 10, wherein the CO2 gassing line 30 is configured to be submerged into the aquarium 12 at its end remote from the gas outflow device 18.

Preferably, the CO2 gassing line 30 comprises a CO2 diffuser 32 at its end remote from the gas outflow device 18, wherein the CO2 diffuser 32 is particularly preferably operable with a flow resistance from 0.3 bar to 0.6 bar, both inclusive, as an overpressure relative to an ambient pressure $p\_U$.

It is further preferred, but not presented in more detail, that the gas vessel pressure regulator 20 is designed in such a way that the gas vessel pressure $p\_G$ is an overpressure relative to an ambient pressure $p\_U$ of at least and including 0.3 bar, preferably at least and including 0.5 bar, particularly preferably at least and including 0.6 bar.

It is further preferred, but not presented in more detail, that the gas vessel pressure regulator 20 is designed such that the gas vessel pressure $p\_G$ is at most and including 3.0 bar, preferably at most and including 1.0 bar, particularly preferably at most and including 0.9 bar.

Particularly preferably, but not shown, the gas vessel pressure regulator 20 is designed in such a way that the gas vessel pressure $p\_G$ is 0.8 bar as overpressure with respect to an ambient pressure $p\_U$. Stated differently, and as an overarching example, the gas vessel pressure $p\_G$ is 0.8 bar above the ambient pressure $p\_U$.

Further preferably, but not presented in more detail, the gas outflow device 18 comprises a needle valve and/or the gas vessel pressure regulator 20 comprises a safety valve.

According to FIGS. 3 to 6, it is preferred that the aquarium pressurized gas vessel 10 comprises an opening safety device 22 in order to adjust the gas vessel pressure $p\_G$ to the ambient pressure $p\_U$ in the event of its actuation.

According to FIGS. 3 to 6, it is preferred that the aquarium pressurized gas vessel 10 is reusable, wherein in particular the receiving vessel 14 is reclosable in a pressure-tight manner by means of the closing device 16.

According to FIG. 3, it is preferred that the closing device 16 is designed as a screw-on lid.

According to FIGS. 4 to 6, it is preferred that the closing device 16 is designed as a snap-on lid, preferably comprising a rotary closing mechanism 24.

According to FIGS. 3 to 6, it is preferred that the gas outflow device 18 comprises a shut-off mechanism 18a to stop the CO2 gas extraction.

According to FIGS. 4 to 6, it is preferred that the gas outflow device 18 comprises a gassing bubble detection device 26 to detect the amount of CO2 gas flowing into the gas outflow device 18.

According to FIGS. 3 to 6, it is preferred that the gas outflow device 18 is arranged at the closing device 16 so that the CO2 gas can flow from the closing device 16 into the gas outflow device 18.

Further preferably, but not presented in more detail, the aquarium pressurized gas vessel 10 includes a seal circumferentially disposed in a coupling region between the receiving vessel 14 and the closing device 16 such that, when the aquarium pressurized gas vessel 10 is closed, the pressure-tight sealing of the receiving vessel 14 results due to the gas vessel pressure p_G pressing the seal into the coupling region between the receiving vessel 14 and the closing device 16.

Further preferably, but not presented in more detail, the gas outflow device 18 and the gas vessel pressure regulator 20 are arranged in a common module which is connected to the receiving vessel 14 and/or to the closing device 16.

According to FIGS. 4 to 6, it is preferred that the gas vessel pressure regulator 20 is connected to the closing device 16.

The gas outflow device 18 may comprise the shut-off mechanism 18a. However, this is an optional embodiment and independent of other features.

The gas outflow device 18 may comprise the gas vessel pressure regulator 20. However, this is an optional embodiment and independent of other features.

The gas outflow device 18 may comprise the opening safety device 22. However, this is an optional embodiment and independent of other features.

LIST OF REFERENCE SIGNS 10 aquarium pressurized gas vessel
12 aquarium
14 receiving vessel
16 closing device
18 gas outflow device
18a shut-off mechanism
20 gas vessel pressure regulator
22 opening safety device
24 rotary closing mechanism
26 bubble counting device
28 CO2 gassing system
30 CO2 gassing line
32 CO2 diffuser
34 58 bar pressure relief valve
p_B gassing pressure
p_G gas vessel pressure
p_U ambient pressure

The invention claimed is:

1. An aquarium pressurized gas vessel for supplying an aquarium (12) with CO2 gas generated in the aquarium pressurized gas vessel (10), wherein the aquarium pressurized gas vessel (10) comprises:
a receiving vessel (14) for receiving a nutrient substrate and a reactant interacting with the nutrient substrate such that the nutrient substrate and the reactant react with each other to generate CO2 gas;
a closing means (16) for closing the receiving vessel (14) in a pressure-tight manner;
a gas outflow device (18) for CO2 gas extraction from the aquarium pressurized gas vessel (10) for the aquarium (12), wherein the CO2 gas has a gassing pressure (p_B) when flowing into the gas outflow device (18); and
a continuously operating, permanently actuatable gas vessel pressure regulator (20) which is configured for adjusting and maintaining a gas vessel pressure (p_G) in such a way that it substantially corresponds to the gassing pressure (p_B).

2. An aquarium pressurized gas vessel according to claim 1, wherein the gas vessel pressure regulator (20) is designed in such a way that the gas vessel pressure (p_G) is an overpressure relative to an ambient pressure of at least and including 0.3.

3. An aquarium pressurized gas vessel according to claim 1, wherein the gas vessel pressure regulator (20) is designed in such a way that the gas vessel pressure (p_G) is an overpressure relative to an ambient pressure of at most and including 3.0.

4. An aquarium pressurized gas vessel according to claim 1, wherein the gas outflow device (18) comprises a needle valve and/or the gas vessel pressure regulator (20) comprises a safety valve.

5. An aquarium pressurized gas vessel according to claim 1, wherein the aquarium pressurized gas vessel (10) comprises an opening safety device (22) in order to adapt the gas vessel pressure (p_G) to the ambient pressure (p_U) in the event of its actuation.

6. An aquarium pressurized gas vessel according to claim 1, wherein the aquarium pressurized gas vessel (10) is reusable, wherein the receiving vessel (14) is reclosable in a pressure-tight manner by means of the closing device (16).

7. An aquarium pressurized gas vessel according to claim 1, wherein the closing device (16) is designed as a screw-on lid or as a snap-on lid.

8. An aquarium pressurized gas vessel according to claim 1, wherein the gas outflow device (18) comprises a shut-off mechanism (18a) for stopping the CO2 gas extraction.

9. An aquarium pressurized gas vessel according to claim 1, wherein the gas outflow device (18) comprises a gassing bubble detection device (26) for detecting the amount of CO2 gas flowing into the gas outflow device (18).

10. An aquarium pressurized gas vessel according to claim 1, wherein the gas outflow device (18) is arranged at the receiving vessel (14) and/or at the closing device (16), so that the CO2 gas can flow into the gas outflow device (18) from the receiving vessel (14) and/or from the closing device (16).

11. An aquarium pressurized gas vessel according to claim 1, wherein the aquarium pressurized gas vessel (10) comprises a seal which is arranged circumferentially in a coupling region between the receiving vessel (14) and the closing device (16), so that, in the closed state of the aquarium pressurized gas vessel (10), the pressure-tight closing of the receiving vessel (14) is obtained in that the gas vessel pressure (p_G) presses the seal into the coupling region between the receiving vessel (14) and the closing device (16).

12. An aquarium pressurized gas vessel according to claim 1, wherein the gas outflow device (18) and the gas vessel pressure regulator (20) are arranged in a common module which is connected to the receiving vessel (14) and/or to the closing device (16).

13. An aquarium pressurized gas vessel according to claim 1, wherein the gas vessel pressure regulator (20) is connected to the receiving vessel (14) and/or to the closing device (16).

14. A CO2 gassing system (28) comprising an aquarium pressurized gas vessel (10) according to claim 1;
wherein the CO2 gassing system (28) comprises:

a CO2 gassing line (30) connected to the gas outflow device (18) for supplying the aquarium (12) with the CO2 gas generated in the aquarium pressurized gas vessel (10), wherein the CO2 gassing line (30) is configured to be submerged into the aquarium (12) at its end remote from the gas outflow means (18).

15. A CO2 gassing system (28) according to claim 14, wherein the CO2 gassing line (30) comprises a CO2 diffuser (32) at its end remote from the gas outflow device (18), wherein the CO2 diffuser (32) is operable with a flow resistance of 0.3 bar to 0.6 bar, both inclusive, as an overpressure relative to an ambient pressure.

16. The aquarium pressurized gas vessel according to claim 7, further comprising a rotary closing mechanism (24).

* * * * *